2,786,060

4-ONIUM-2,3,5-TRICHALCOGENPYRROLIDYLIDES AND THEIR PREPARATION

Edward G. Howard, Jr., Wilmington, Del., assignor to E. I. du Pont de Nemours and Company, Wilmington, Del., a corporation of Delaware No Drawing. Application March 9, 1953, Serial No. 341,333

22 Claims. (Cl. 260—296)

This invention relates to a new class of heterocyclic compounds and to their preparation. More specifically, this invention relates to a new class of functionally substituted pyrrolidines and to their preparation.

Many pyrrolidines and functionally substituted pyrrolidines are known to the art and their chemistry has proven of considerable interest. Because of the wide variety of useful chemical derivatives preparable therefrom, the pyrrolidines carrying a plurality of functional substituents are particularly outstanding. For instance, considerable attention has been given to pyrrolidine derivatives wherein three of the ring carbons are directly involved in functional linkages, e. g., the triketopyrrolidines. However, these interesting compounds are rather sensitive to aqueous acid, with the pyrrolidine ring being easily broken under such conditions. Accordingly, their utility is somewhat limited.

In my copending application S. N. 315,203, filed October 16, 1952, now abandoned, of which my S. N. 458,961, filed September 28, 1954, is a continuation-in-part, I have disclosed and claimed a new class of functionally substituted pyrrolidine derivatives which have in each of the 2,3, and 5 positions oxygen or sulfur substituents and in the 4-position a negative, i. e., electron attractive, functional group containing a multiple linkage therein, e. g., a negative functional group which upon hydrolysis is converted to a carboxylic acid group. These new functionally substituted pyrrolidine derivatives are extremely stable to aqueous acid and are thus much more useful than the previously known functionally substituted pyrrolidines. However, these new compounds, while being still more valuable in forming extremely stable salts and complexes with metallic ions, are for this very reason more difficult to prepare and purify in free, i. e., non-salt, form. In some instances, such as in pesticidal and fungicidal applications, it is frequently desirable to apply such compounds in organic solvents for which use the free form of the compound is preferred.

It is an object of this invention to provide a new class of functionally substituted pyrrolidines and a method for their preparation. A further object is to provide a new class of pyrrolidines in which all four carbons of the heterocyclic ring are directly involved in or are directly bonded to functional groups and which are readily and easily preparable in free form. A still further object is to provide a new class of functionally substituted pyrrolidines which generically exhibit luminescent response of varying degrees depending on the wave-lengths of the exciting light and are thus useful as "phosphors." Other objects will appear hereinafter.

The objects of this invention are accomplished by providing 4-substituted pyrrolidines carrying in each of the 2,3, and 5-positions of the heterocyclic nucleus a chalcogen of atomic number less than 17, i. e. oxygen or sulfur, and having attached to the carbon atom in the 4-position of the heterocyclic nucleus a positive, i. e. electron deficient, ionically charged functional group, and a method for their preparation. The remaining free valence of the pyrrolidine ring, i. e. the single valence of the 1-nitrogen, is satisfied by hydrogen or a monovalent organic radical free of Zerewitinoff active hydrogen.

More specifically, these new compounds are 4-onium-2,3,5-trichalcogenpyrrolidines, i. e. 4-onium-2,3,5-trioxo- or triketopyrrolidines, 4-onium-2,3,5-trithiopyrrolidines and 4-onium-2,3,5-trioxo/thiopyrrolidines. Thus, these compounds carry in the 4-position, the positive portion, i. e. cation, of an onium or inium compound, e. g. ammonium, pyridinium, phosphonium, sulfonium and the like. Chem. Ab. 39, 5937, sec. 368, under "Onium" compounds, states that perhaps a better title would be "Ium compounds" or "Compounds containing an organic cation" and that the term "onium" includes "inium."

Hackh's Chemical Dictionary, third edition, page 594 (1946), defines an "onium compound" as a group of organic compounds of the type $RXH_y$ which are isologs of ammonium and contain the element X in its highest positive valency. X is nitrogen, phosphorus, sulfur, etc. as in ammonium, phosphonium, sulfonium, etc.

These new 4-onium substituted 2,3,5-trichalcogenpyrrolidines can be represented by the following structural formula

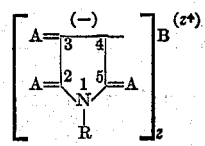

wherein the A's are chalcogens of atomic number less than 17, i. e., oxygen or sulfur, alike or different, R is hydrogen or a monovalent organic radical free of Zerewitinoff active hydrogen, preferably solely hydrocarbon, more preferably of from 1 to 7 carbon atoms, and most preferably hydrocarbon free of aliphatic unsaturation, particularly saturated aliphatic hydrocarbon such as alkyl, B is the positive portion or cation of the onium compound, particularly a cation of the class of onium bases consisting of ammonium, pyridinium, sulfonium and phosphonium bases, and z is a positive integer of 1 to 3 and usually 1. Preferably the A's in at least position 5 and either positions 2 or 3 or both positions 2 and 3 are oxygen and most preferably all three A's are oxygen. However, all of the A's may be sulfur or some of the A's may be sulfur and the remainder of the A's oxygen. The preferred positive onium moieties or cations are those from the ammonium, pyridinium, sulfonium and phosphonium type compounds, particularly the first three, since such type compounds are more readily available and generally can be more readily purified and handled.

The new compounds of this invention contain a positive onium fragment or onium cation and a negatively charged trichalcogenpyrrolidyl nucleus. Such type compounds containing a positive onium fragment or onium cation and a negatively charged organic radical, including solely hydrocarbon and heterocyclic, are of a special class most conveniently termed ylides, c. f. Wittig, Angewandte Chemie, 63, 15–18 (1951). Thus, the new compounds of this invention can more properly be termed 4-onium-2,3,5-trichalcogenpyrrolidylides and the term pyrrolidylides can be used wherever the new compounds of this invention are referred to herein as pyrrolidines. The class name pyrrolidylide expresses the fact that the cation of the onium base is joined to carbon of the pyrrolidine nucleus by a homopolar valence (yl) and an ionic bond (ide).

In the case of those onium compounds having available more than one hydrogen, more than one 2,3,5-trichalcogenpyrrolidyl nucleus can be bonded ionically to the polyhydrogen-containing onium fragment or cation. It is to be noted that there is a single overall negative ionic charge on each pyrrolidyl ring for every positive onium charge on the onium fragment in position 4, i. e., the compounds in the molecular sense are ionically neutral. It is believed the majority of this ionic negative charge in each ring is centered in the substituent on the carbon in the 3-position, but obviously this is in no manner to be considered as a limitation on the scope of the present invention.

Because of the ionic charge separation involved in the structure of these compounds as brought about by the character of the onium substituent, the molecules, while electronically neutral in the overall sense, have somewhat the character of the betaines, the thetines, and the Zwitterions, particularly the latter, as most familiarly exemplified in the alpha-amino acids. It is to be noted that the new compounds of this invention exist as equilibrium mixtures of resonance stabilized desmotropic and mesoionic forms in addition to the above-referred to ylide type charge separation and also undergo reactions in one or more of these structures depending on conditions. These contributing equilibrium structures arise because of the high degree of conjugated multiple linkages existing in the molecular structure of these new compounds as well as the known propensity for carbonyl and thiocarbonyl groups (particularly in a ring) to react as if they were in the

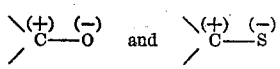

forms. In referring to these compounds, following conventional practice, no attempt will be made to designate the various contributing resonance structures; they will simply be referred to generically as 4-onium-2,3,5-trichalcogenpyrrolidlyides.

Suitable examples of specific equilibrium contributing, resonance stabilized structures are illustrated by the following structural formulas wherein the symbols have their previously indicated meanings:

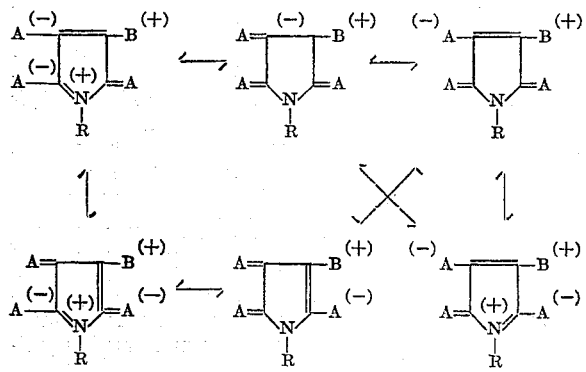

These various equilibrium, resonance stabilized desmotropic and mesoionic structures are given for a better understanding of the nature and properties of the novel compounds of this invention and obviously in no manner are to be considered as a limitation on the scope of the present invention.

These new 4-onium-2,3,5-trichalcogenpyrrolidylides can be easily and conveniently prepared in high yields by the direct condensation under strongly basic anhydrous conditions, preferably in the presence of essentially stoichiometric proportions of an organic soluble strong base, between oxalate or thiooxalate esters and primary or secondary, i. e., mono or diamido hydrogen-bearing, amides of acetic, thiolacetic, thionoacetic, and dithioacetic acids, wherein the alpha carbon carries two hydrogens and has directly singly bonded thereto a positively charged fragment or cation of an onium compound. The condensation normally is carried out at temperatures in the ranges −25° to 150° C. or higher, preferably 0° to 100° C. and most preferably 10° to 70° C., under anhydrous conditions using a normally liquid organic reaction medium.

The base can be any one or more of the organic soluble, extremely strong bases suitable for use in the Claisen condensation and is present in the reaction zone in at least equimolar proportions based on the reactants, i. e., at least one mole of base will be present on a molar basis for each 4-onium-2,3,5-triketopyrrolidylide link formed. Suitable examples of this class of organic soluble, extremely strong bases, in addition to those given in the foregoing examples, include the alkali metal and the alkaline earth metal alcoholates, usually the alkoxides, e. g., lithium methylate, magnesium ethylate, and the like; the hydrocarbometallic compounds and complexes, usually the alkali metal and alkaline earth metal hydrocarbocompounds and complexes, such as the alkyls, aryls, alkaryls, and aralkyls including complexes with the polynuclear aromatic hydrocarbons, suitable examples of which include sodiumethyl, lithiumphenyl, calciumbenzyl, and sodium-anthracene complex; the metal amides, particularly the alkali metal and alkaline earth metal amides, such as sodamide and the like. Because of their efficiency in the condensation reaction, the alkali metal alkoxides are normally used. For convenience, these alkali metal alkoxides are generated, in situ, from the corresponding alkali metal and an alkanol, the latter being conveniently used in excess to serve as the organic reaction medium.

The oxalate esters used can be those of any of the monovalent alcohols or phenols with oxalic or thiooxalic, including the thiolo-, thiono- and dithiooxalic, acids and, for reasons of greater availability, are normally the symmetrical oxalate esters of the primary lower aliphatic monoalcohols or monophenols of normally no more than seven carbons, e. g., dihexyl, o-, m-, or p-ditolyl, diphenyl, dipropyl oxalates; dimethyl, diisopropyl dithionooxalates; diethyl tetrathiooxalates, and the like. Depending on whether one or both of the carbonyl oxygens are replaced by sulfur, one or both of the substituents on the 2- and 3- carbons of the new 4-onium-2,3,5-trioxo/thiopyrrolidines will be sulfur. It is to be understood that other oxalic acid derivatives than the esters can be similarly used such as the acid halides, the half acid esters, the half ester acid halides, and even oxalic acid itself and its salts as well as other possible mixed oxalic acid, ester, and acid halide derivatives. However, because of their much greater reaction efficiency the esters are preferred. The particular oxalate ester used is not at all critical since neither of the RO— or RS— groups of either of the ester (ROCO—), thiolester (RSCO—), thionoester (ROCS—), or dithioester (RSCS—) functionalities, as is true of the other useable derivatives, appears in the end product, i. e., the only portion of the oxalic acid derivative appearing in the resulting product is the —CO—CO— unit or the corresponding mono- or disulfur substituted unit.

The class of reactants used in conjunction with the above-referred to oxalate esters to form the new compounds of the present invention are alpha-onium substituted, amide hydrogen bearing acetamides and thioacetamides. These compounds can be conveniently described by the following structural formula:

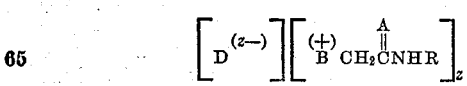

wherein D represents the simple acid anion associated with the onium fragment, or cation, e. g., methylsulfate, phosphate, chloride and the like. A, B, R, and z have the same meanings as herein set forth in the general formula for the new compounds of this invention. These reactant compounds, as indicated by the formula, are normally used in the form of salts with the simple acids since in this form they are more readily purifiable and more easily handled. However, they can obviously also be in the free base form, in which instance D will, of course, be HO⁻. Suitable specific examples of these necessary intermediates include bis(1-methyl-1-carbamylmethylpiperidinium)sulfate; methylethyl(N-allylcarbamylmethyl)sulfonium iodide; 1-ethyl-1-(N-methylcarbamylmethyl)morpholinium methylsulfate; bis(1-carbamylmethylpyridinium chloride), and the like.

It is to be noted that polysalts containing acid anions of plural valence can also be used including those instances where there are more than one of the onium acetamide and thioacetamide groups thereto ionically linked. Also the cations can be linked through a covalent bond. In these latter instances, bis-pyrrolidylides will be obtained, i. e., there will be two or more of the previously described 4-onium-2,3,5-trichalcogenpyrrolidylide units, either linked ionically to the same polyacid anion or together joined through the bis-type cation. It is to be noted that in the new compounds of this invention the A-substituent in the just described acetamide and thioacetamide onium compound intermediates will appear in the final 4-onium-2,3,5-trichalcogenpyrrolidylides in position 5, the B-substituent will be the positive onium fragment or cation on position 4, and the R radical on the aforesaid hydrogen-bearing amide group will appear as the substituent in position 1, i. e., on the nitrogen, of the pyrrolidylide fragment.

The following examples, in which the parts given are by weight, are submitted to further illustrate but not to limit the present invention.

EXAMPLE I

*Preparation of 4-pyridinium-2,3,5-triketopyrrolidylide*

To a solution of 1.84 parts of metallic sodium dissolved in about 200 parts of absolute methanol was added with stirring at room temperature 10 parts of carbamylmethylpyridinium chloride and 10.2 parts of diethyl oxalate (both in 0.9 molar proportions based on the sodium). After a short time at room temperature, a bright yellow solid began to form and the resulting mixture was stirred for 25 minutes more. At the end of this time the solid was removed by filtration and dried.

There was thus obtained 7.5 parts (56.5% of theory) of crude 4-pyridinium-2,3,5-triketopyrrolidylide. After recrystallization from hot water, the pure 4-pyridinium-2,3,5-triketopyrrolidylide was obtained as bright, yellow crystals melting at 309–312° C. and exhibiting green and greenish-yellow luminescent response of medium magnitude after excitation by ultraviolet light of, respectively, 2537 A. and 3650 A. wavelength, as well as a green cathodoluminescence, again of medium intensity.

Analysis.—Calc'd for $C_9H_6N_2O_3$: C, 56.78%; H, 3.16%; N, 14.73%. Found: C, 56.99%; H, 3.34%; N, 14.57%.

EXAMPLE II

*Preparation of 4-trimethylammonium-2,3,5-triketopyrrolidylide*

To a solution of 4.6 parts of metallic sodium dissolved in about 80 parts of absolute ethyl alcohol was added in one portion at 40° C. with rapid stirring 18.0 parts of dry, powdered trimethylcarbamylmethylammonium chloride (0.9 molar proportion based on sodium), followed immediately by the addition in one portion of 17.3 parts (0.6 molar proportion based on sodium) of diethyl oxalate. The reaction mixture instantly turned an intense yellow color and, after stirring for an additional hour at room temperature, the resulting solid was removed by filtration.

After drying, there was obtained 23 parts of crude 4-trimethylammonium-2,3,5-triketopyrrolidylide. An ethanol solution of a portion of the product was neutralized to indicator paper with concentrated hydrochloric acid, the resulting less intensely yellow colored solution filtered, and the filtrate cooled in an ice/water bath. Upon removal of the resulting solid by filtration and recrystallization thereof from absolute ethanol, there was thus obtained pure 4-trimethylammonium-2,3,5-triketopyrrolidylide as an intensely yellow crystalline solid decomposing at 240° C. and melting at 263° C. to a black residue.

Analysis.—Calc'd for $C_7H_{10}N_2O_3$: C, 49.40%; H, 5.92%; N, 16.47%. Found: C, 49.49%, 49.74%; H, 5.65%, 6.21%; N, 16.30%, 16.31%.

EXAMPLE III

*Part A.—Preparation of methylcarbamylmethyl sulfide*

To a stirred solution of 23 parts of metallic sodium dissolved in about 400 parts of absolute ethanol was added at room temperature with stirring 48 parts (an equimolar proportion based on sodium) of methyl mercaptan. The resulting clear solution was cooled at 10° C. and 93.5 parts (an equimolar proportion based on the sodium) of chloroacetamide was added over a one-hour period in small portions with stirring. The resulting mixture was warmed slowly to 40° C., stirred at this temperature for an additional hour, then heated rapidly to boiling, and finally filtered while hot. The filtrate was cooled in an ice/water bath and the resulting crystalline solid was removed by filtration. There was thus obtained 73 parts (69% of theory) of crude methylcarbamylmethyl sulfide. A sample of the product after recrystallization from ethanol was obtained as white crystals melting at 99–102° C. with decomposition.

Analysis.—Calc'd for $C_3H_7NOS$: C, 34.26%; H, 6.72%; N, 13.32%; S, 30.49%. Found: C, 34.40%, 34.39%; H, 6.85%, 6.88%; N, 13.17%; S, 30.85%, 30.54%.

*Part B.—Preparation of dimethylcarbamylmethylsulfonium iodide*

A solution of 10.5 parts of the above methylcarbamylmethyl sulfide and 14.2 parts (1.0 molar proportion based on the sulfide) of methyl iodide in about 28 parts of absolute ethanol was heated at 50° C. with stirring for one-half hour. The solid crystalline product resulting was removed by filtration and dried. There was thus obtained 17 parts (69% of theory) of dimethylcarbamylmethylsulfonium iodide. After recrystallization from absolute ethanol, the product was obtained in the form of large yellow crystals, soluble in water and giving a copious pale yellow precipitate therefrom with silver nitrate solution.

Analysis.—Calc'd for $C_4H_{10}NOSI$: N, 5.67%; I, 51.37%. Found: N, 5.43%, 5.51%; I, 51.54%.

*Part C.—Preparation of 4-dimethylsulfonium-2,3,5-triketopyrrolidylide*

To a stirred solution of 1.0 part of sodium dissolved in about 54 parts of absolute ethanol was added at room temperature 7.3 parts (0.7 molar proportion based on sodium) of the above dimethylcarbamylmethylsulfonium iodide and 4.4 parts (1.05 molar proportion based on the iodide) of diethyl oxalate. The reaction mixture was stirred at room temperature for two hours and the solid thereby formed removed by filtration.

After drying there was obtained 4 parts of crude 4-dimethylsulfonium-2,3,5-triketopyrrolidylide as an extremely hygroscopic crystalline solid. After recrystallization from hot absolute ethanol containing sufficient concentrated hydrochloric acid to give a neutral less yellow-colored solution and a second recrystallization from hot absolute ethanol, the pure 4-dimethylsulfonium-2,3,5-triketopyrrolidylide was obtained as yellow crystals melting with rapid decomposition at 205–210° C.

Analysis.—Calc'd for $C_6H_7NO_3S$: N, 8.09%. Found: N, 8.03%.

This invention is generic to a new class of neutral 2,3,5-trichalcogenpyrrolidines carrying in the 4-position the ionically, positively charged moiety or cation of an onium compound, singly and covalently linked to the ring carbon in the said 4-position of each said pyrrolidine nucleus which carries an overall single, ionically negative charge. The onium compounds are well recognized as the group of organic compounds of the type $RXH_y$, $R_2XH_{y-1}$, etc. being isologs of ammonium and containing element X in its highest positive valency $(y+1)$. The positive portion or cation of the onium base can be represented by $(RXH_{y-1})+$, $(R_2XH_{y-2})+$, etc. R is a monovalent organic radical free of Zerewitinoff active hydrogen, preferably solely hydrocarbon, more preferably of 1 to 7 carbon atoms, which can together be joined to form with the central element X a heterocycle, and most preferably hydrocarbon free of aliphatic unsaturation, particularly a saturated aliphatic hydrocarbon radical, such as alkyl.

Because of the availability of the necessary intermediates and the cleaner reaction behavior in the preparation of the products of this invention, the preferred positively charged onium group in the 4-position has all valences of the central element X, other than those satisfied in a single covalent link to each pyrrolidine nucleus and in ionic positive charge or charges, satisfied by organic radicals free of Zerewitinoff active hydrogen and preferably by hydrocarbon radicals, preferably free of aliphatic unsaturation, generally of no more than seven carbons each, which can together be joined to form with the said central element X a heterocycle, conventionally of from 5 to 7 ring members. The most preferred compounds of this invention, because of the much greater availability of the necessary intermediates, are the substituted ammonium including pyridinium, sulfonium, and phosphonium pyrrolidylides, especially the former two types.

Specific examples of the new compounds of this invention in addition to those already illustrated in the foregoing examples, are those 2,3,5-trichalcogenpyrrolidylides carrying in the 4-position: a substituted ammonium group, e. g., 4 - (1 - methylmorpholinium) - 2,3,5 - triketopyrrolydylide, and preferably a solely hydrocarbon substituted ammonium group, e. g., 4-dibenzylmethylammonium) - 2,3,5 - triketopyrrolidylide; 4 - cyclohexyldiethylammonium - 2 - thio - 3,5 - dioxopyrrolidylide, 4 - quinolinium - 2,3,5 - triketopyrrolidylide; a hydrocarbon substituted sulfonium group, e. g., 4-benzylmethylsulfonium - 2,3,5 - triketopyrrolidylide, 4 - cyclohexylethylsulfonium - 2,3,5 - triketopyrrolidylide, and the like.

The substitutent in the 1-position of the new compounds of this invention, i. e., the substituent on the ring nitrogen, need not necessarily be hydrogen but can also be aromatic, aliphatic, cycloaliphatic, alkaromatic, or araliphatic hydrocarbon in nature, usually of no more than seven carbons and also free of both Zerewitinoff active hydrogen and aliphatic unsaturation. Suitable examples of the new compounds of this invention, carrying a hydrocarbon radical singly linked to the nitrogen in position 1, include 4 - pyridinium - 1 - butyl - 2,3,5 - triketopyrrolydylide, 4 - ethyldimethylammonium - 1-cyclohexyl - 2,3,5 - triketopyrrolidylide, 4 - dimethylsulfonium - 1 - ethyl - 2,3,5 - triketopyrrolidylide, and the like.

These new 4-onium-2,3,5-trichalcogenpyrrolidylides are generically crystalline solids of relatively high melting point and exhibit good water solubility, particularly under mildly acidic conditions. These compounds have a characteristic ultraviolet absorption curve, exhibiting a major absorption peak in the range of 2250–2350 A. and 3300–3400 A. under acid conditions. These 4-onium-2,3,5-trichalcogenpyrrolidylides generically exhibit luminescent response of varying degrees depending on the wave-lengths of the exciting light and are thus useful in such important commercial outlets as phosphors for use in television tubes and the like.

The preferred 4-onium-2,3,5-trioxopyrrolidylides carrying in the 4-position the positive fragment of a nitrogen onium compound, i. e., the ammonium and imonium, including onium, inium and olium types (Chem. Ab. 39, 5937, sec. 369), as exemplified specifically by Examples I and II, are generally characterized by a yellow to orange coloration. The preferred ammonium-2,3,5-trioxopyrrolidylides exhibit green to geenish-yellow luminescence after excitation by ultraviolet light and are further characterized in exhibiting a green cathodoluminescence. Certain of these new 4-onium substituted 2,3,5-trichalcogenpyrrolidines also exhibit interesting physiological activity, for instance, as pesticides or fungicides, or both.

As many apparently widely different embodiments of this invention can be made without departing from the spirit and scope thereof, it is to be understood that this invention is not limited to the specific embodiments thereof except as defined in the appended claims.

I claim:

1. A substituted pyrrolidylide having a negative ionic charge on the pyrrolidyl nucleus and carrying in the 2-position thereof a chalcogen of atomic number less than 17 and in each of the 3- and 5-positions thereof an oxygen atom, and having attached to the carbon atom in the 4-position of the pyrrolidyl nucleus an onium cation in which the central atom is attached to the pyrrolidyl nucleus and has all remaining valences thereof satisfied solely by organic radicals free of Zerewitinoff active hydrogen and free of aliphatic unsaturation and of not more than 7 carbon atoms.

2. A substituted pyrrolidylide having a negative ionic charge on the pyrrolidyl nucleus and carrying in the 2-position thereof a chalcogen of atomic number less than 17 and in each of the 3- and 5-positions thereof an oxygen atom, and having attached to the carbon atom in the 4-position of the pyrrolidyl nucleus an ium cation selected from the class consisting of pyridinium, ammonium and sulfonium cations in which the respective ium nitrogen and sulfur atoms are attached to the pyrrolidyl nucleus and have all remaining valences thereof satisfied solely by organic radicals free of Zerewitinoff active hydrogen and free of aliphatic unsaturation and of not more than 7 carbon atoms.

3. A substituted pyrrolidylide having a negative ionic charge on the pyrrolidyl nucleus and carrying in the 2-position thereof a chalcogen of atomic number less than 17 and in each of the 3- and 5-positions thereof an oxygen atom, and having attached to the carbon atom in the 4-position of the pyrrolidyl nucleus the pyridinium cation.

4. A substituted pyrrolidylide having a negativ ionic charge on the pyrrolidyl nucleus and carrying in the 2-position thereof a chalcogen of atomic number less than 17 and in each of the 3- and 5-positions thereof an oxygen atom, and having attached to the carbon atom in the 4-position of the pyrrolidyl nucleus an ammonium cation in which the ammonium nitrogen atom is attached to the pyrrolidyl nucleus and has all remaining valences thereof satisfied solely by hydrocarbon radicals free of aliphatic unsaturation and of not more 7 carbon atoms.

5. A substituted pyrrolidylide having a negative ionic charge on the pyrrolidyl nucleus and carrying in the 2-position thereof a chalcogen of atomic number less than 17 and in each of the 3- and 5-positions thereof an oxygen atom, and having attached to the carbon atom in the 4-position of the pyrrolidyl nucleus a sulfonium cation in which the sulfonium sulfur atom is attached to the pyrrolidyl nucleus and has all remaining valences thereof satisfied solely by hydrocarbon radicals free of aliphatic unsaturation and of not more than 7 carbon atoms.

6. A substituted pyrrolidylide having the formula

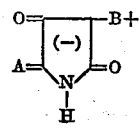

wherein A is a chalcogen of atomic number less than 17 and B is an onium cation in which the central atom is attached to the pyrrolidyl nucleus and has all remaining valences thereof satisfied solely by hydrocarbon radicals free of aliphatic unsaturation and of not more than 7 carbon atoms.

7. A substituted pyrrolidylide having the formula

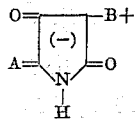

wherein A is a chalcogen of atomic number less than 17 and B is an onium cation in which the central atom attached to the pyrrolidyl nucleus is nitrogen and has all remaining valences thereof satisfied solely by hydrocarbon radicals free of aliphatic unsaturation and of not more than 7 carbon atoms.

8. A substituted pyrrolidylide having the formula

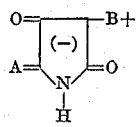

wherein A is a chalcogen of atomic number less than 17 and B is an ominum cation in which the central atom attached to the pyrrolidyl nucleus is sulfur and has all remaining valences thereof satisfied solely by hydrocarbon radicals free of aliphatic unsaturation and of not more than 7 carbon atoms.

9. A substituted pyrrolidylide having the formula

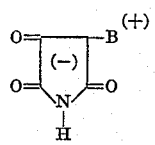

wherein B is an ammonium cation in which the ammonium nitrogen atom is attached to the pyrrolidyl nucleus and has all remaining valences thereof satisfied solely by hydrocarbon radicals free of aliphatic unsaturation and of not more than 7 carbon atoms.

10. 4-trimethylammonium - 2,3,5 - triketopyrrolidylide having the formula

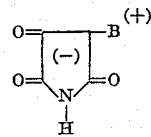

wherein B is the trimethylammonium cation.

11. 4-pyridinium-2,3,5-triketopyrrolidylide having the formula

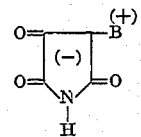

wherein B is the pyridinium cation.

12. A substituted pyrrolidylide having the formula

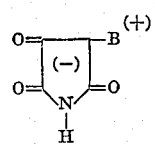

wherein B is a sulfonium cation in which the sulfonium sulfur atom is attached to the pyrrolidyl nucleus and has all remaining valences thereof satisfied solely by hydrocarbon radicals free of aliphatic unsaturation and of not more than 7 carbon atoms.

13. 4 - dimethylsulfonium - 2,3,5 - triketopyrrolidylide having the formula

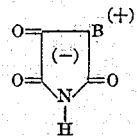

wherein B is the dimethylsulfonium cation.

14. A process which comprises condensing a diester selected from the class consisting of oxalate and thiooxalate diesters of the primary lower aliphatic monoalcohols and monophenols of not more than 7 carbon atoms, in the presence of at least equimolar proportions of an organic soluble strong base, with an alpha-onium substituted amide selected from the class consisting of acetamides and thioacetamides wherein amide-nitrogen bears at least one hydrogen atom and the remaining valence thereof is satisfied solely by a member selected from the class consisting of hydrogen and mono-valent hydrocarbon radicals free of aliphatic unsaturation and of not more than 7 carbon atoms, and wherein the alpha carbon bears two hydrogen atoms and has directly singly bonded thereto an onium cation in which the central atom is attached to the alpha carbon atom and has all remaining valences thereof satisfied solely by organic radicals free of Zerewitinoff active hydrogen and free of aliphatic unsaturation and of not more than 7 carbon atoms.

15. A process which comprises condensing an oxalate diester of a primary lower aliphatic monoalcohol of not more than 7 carbon atoms, in the presence of at least equimolar proportions of an alkali metal alkoxide, with an alpha-onium substituted acetamide wherein amide-nitrogen bears two hydrogen atoms and wherein the alpha carbon bears two hydrogen atoms and has directly singly bonded thereto an onium cation in which the central atom is attached to the alpha carbon atom and has all remaining valences thereof satisfied solely by hydrocarbon radicals free of aliphatic unsaturation and of not more than 7 carbon atoms.

16. A process which comprises condensing an oxalate diester of a primary lower aliphatic monoalcohol of not more than 7 carbon atoms, in the presence of at least equimolar proportions of an alkali metal alkoxide, with an alpha-onium substituted acetamide wherein amide-nitrogen bears at least one hydrogen atom and the remaining valence thereof is satisfied solely by a member selected from the class consisting of hydrogen and monovalent hydrocarbon radicals free of aliphatic unsaturation and of not more than 7 carbon atoms, and wherein the alpha carbon bears two hydrogen atoms and has directly singly bonded thereto an ium cation selected from the class consisting of pyridinium, ammonium and sulfonium cations in which the respective ium nitrogen and sulfur atoms are attached to the alpha carbon atom and have all remaining valences thereof satisfied solely by organic radicals free of Zerewitinoff active hydrogen and free of aliphatic unsaturation and of not more than 7 carbon atoms.

17. A process which comprises condensing a lower dialkyl oxalate wherein the alkyl groups are of not more than 7 carbon atoms, in the presence of at least equimolar proportions of an alkali metal alkoxide, with an alpha-pyridinium substituted acetamide wherein the amide-nitrogen bears two hydrogen atoms and wherein the alpha carbon bears two hydrogen atoms and has directly singly bonded thereto the pyridinium cation.

18. A process which comprises condensing a lower dialkyl oxalate wherein the alkyl groups are of not more than 7 carbon atoms, in the presence of at least equimolar proportions of an alkali metal alkoxide, with an alpha-ammonium substituted acetamide wherein the amide-nitrogen bears two hydrogen atoms and wherein the alpha carbon bears two hydrogen atoms and has directly singly bonded thereto an ammonium cation in which the ammonium nitrogen atom is attached to the alpha carbon atom and has all remaining valences thereof satisfied solely by hydrocarbon radicals free of aliphatic unsaturation and of not more than 7 carbon atoms.

19. Process which comprises condensing a lower dialkyl oxalate wherein the alkyl groups are of not more than 7 carbon atoms, in the presence of at least equimolar proportions of an alkali metal alkoxide, with an alpha-sulfonium substituted acetamide wherein the amide-nitrogen bears two hydrogen atoms and wherein the alpha carbon bears two hydrogen atoms and has directly singly bonded thereto a sulfonium cation in which the sulfonium sulfur atom is attached to the alpha carbon atom and has all remaining valences thereof satisfied solely by hydrocarbon radicals free of aliphatic unsaturation and of not more than 7 carbon atoms.

20. A process which comprises condensing, in the presence of sodium alcoholate, diethyl oxalate and carbamylmethylpyridinium chloride.

21. A process which comprises condensing, in the presence of sodium alcoholate, diethyl oxalate and trimethylcarbamylmethylammonium chloride.

22. A process which comprises condensing, in the presence of sodium alcoholate, diethyl oxalate and dimethylcarbamylmethylsulfonium iodide.

References Cited in the file of this patent

Chemical Abst., vol. 39, pp. 5937–39 (1945).